(12) United States Patent
Lee (10) Patent No.: US 7,455,139 B2
(45) Date of Patent: Nov. 25, 2008

(54) VEHICLE SAFETY LIGHTING & SIGNALING SYSTEM

(76) Inventor: Richard Cheng Lee, P.O. Box 601792, San Diego, CA (US) 92160

( * ) Notice: Subject to any disclaimer, the term of this patent is extended or adjusted under 35 U.S.C. 154(b) by 166 days.

(21) Appl. No.: 10/856,571

(22) Filed: May 28, 2004

(65) Prior Publication Data
US 2005/0275193 A1    Dec. 15, 2005

(51) Int. Cl.
*B60T 7/16* (2006.01)
*B62D 1/24* (2006.01)
*B60R 25/10* (2006.01)
*B60Q 1/26* (2006.01)

(52) U.S. Cl. .................. 180/167; 180/169; 340/426.16; 340/426.17; 340/468

(58) Field of Classification Search .................. 180/167, 180/169; 340/426.16, 426.17, 468
See application file for complete search history.

(56) References Cited

U.S. PATENT DOCUMENTS

| | | | | |
|---|---|---|---|---|
| 3,836,759 | A | * | 9/1974 | Silverman .................... 362/103 |
| 4,760,373 | A | | 7/1988 | Reilly |
| 4,901,210 | A | * | 2/1990 | Hanabusa .................... 362/106 |
| 5,477,209 | A | | 12/1995 | Benson, Jr. et al. |
| 6,097,287 | A | * | 8/2000 | Lu .............................. 340/479 |
| 6,177,867 | B1 | * | 1/2001 | Simon et al. ................. 340/468 |
| 6,348,859 | B1 | * | 2/2002 | Baker .......................... 340/479 |
| 6,406,168 | B1 | | 6/2002 | Whiting |
| 6,677,856 | B2 | | 1/2004 | Perlman et al. |
| 6,686,837 | B2 | | 2/2004 | Kim |
| 6,784,795 | B1 | * | 8/2004 | Pories et al. ................. 340/479 |
| 2003/0213045 | A1 | | 11/2003 | Fuentes |

FOREIGN PATENT DOCUMENTS

| | | |
|---|---|---|
| EP | 0 901 312 A2 | 3/1999 |
| GB | 2 331 801 A | 6/1999 |
| GB | 2 341 227 A | 3/2000 |

* cited by examiner

*Primary Examiner*—Christopher Ellis
*Assistant Examiner*—John R Olszewski
(74) *Attorney, Agent, or Firm*—Procopio, Cory, Hargreaves & Savitch LLP (57) ABSTRACT

A vehicle safety lighting and signaling system includes a transmitting unit and multiple remote receiving units, each having a lighting and audible element, and that receive signals from the transmitting unit and selectively activates its signaling elements according to a predetermined signal response directed by the transmitting unit. The receiving unit includes a central processor that selectively decodes transmitted signals received from the transmitting unit and provides signals to a driver circuit that activate a visual signal, and audible signal, or both. A receiving unit may have an integral base affixed to an adjustable band, clothing or motorcycle, and that receiving unit is detachable from the base for charging and/or programming. The remote receiving units may include a band that is expandable for positioning about a cycle riders' arm or leg, and includes one or more lighting elements responsive to receiving a predetermined signal.

25 Claims, 13 Drawing Sheets

TABLE OF OPERATION

| SIGNAL # | 1 | 2 | 3 | 4 | 5 | 6 |
|---|---|---|---|---|---|---|
| LEFT TURN [1] | | | | ON | ON | |
| RIGHT TURN [1] | | ON | ON | | | |
| STOP | ON | | | | | ON |
| RUNNING LIGHT | ON | ON | ON | ON | ON | ON |
| EMERG./HAZARD | ← ALL FLASHING ON AND OFF → | | | | | |
| RPM > X | | | | | | |
| HAZARD. | ON | | | | | |
| SIREN | ← ALL FLASHING ON AND OFF → | | | | | |
| PHOTOCELL | | ON | | | | |
| LIGHT SENSOR | | ON | | | | |
| | | | | | | |
| | | | | | | |

VEHICLE SAFETY LIGHTING & SIGNALING SYSTEM

FIELD OF THE INVENTION

The present invention relates generally to vehicle safety devices. The present invention is more particularly related to lighting systems for vehicles. The present invention is more specifically, though not exclusively, useful as an audio and visual warning system for use while riding motorcycles to provide for increased safety through the addition of supplemental signaling devices.

BACKGROUND OF THE INVENTION

Motorcyclists have long been aware of the dangers of riding on roadways alongside other, larger motor vehicles. The hectic lifestyles that today's drivers experience often results in automobile drivers being preoccupied, and results in the drivers' being unaware of the presence of motorcycle drivers. Also, the common use of cellular telephones while driving decreases the drivers' awareness even further. Most motorcycles are equipped with too few signal devices (a single rear brake light and small signals). Visibility is a challenge with motorcyclists because of their size. More importantly, it is a challenge for motorcyclists to signal their intentions to other motorists on the road. Typically, the brake and signal lamps on a motorcycle are positioned low and are much smaller in size from automobile signals. To increase their visibility among motorists, some bikers opt to wear bright colored vests or garments. This helps increase visibility but does not assist in signaling (braking, turning left, turning right, emergency) to other motorists sharing the road. Motorcyclists can be seen using their arms and even legs to signal their intentions (flanking an arm to signal left or right, sticking out a leg to signal left or right). Taking hands or feet away from controls while operating a moving vehicle can prove to be fatally dangerous. Yet, motorists feel the need to signal their intentions regardless. The present invention helps to resolve this problem.

In order to assist motorcycle riders to minimize the dangers of riding alongside other vehicles, many companies offer motorcycle safety courses with the sale of each new motorcycle. These courses typically teach defensive riding skills and other techniques for minimizing the likelihood of being involved in an accident. However, despite the safety training and a motorcyclists' use of extreme caution, many accidents between automobiles and motorcycles occur. These accidents are particularly dangerous for a motorcycle rider given the size and weight differences that exist between a motorcycle and other vehicles.

In addition to accidents with other drivers, solo accidents with motorcyclists pose challenges to rescuers. For instance, while riding in terrain such as mountains, a motorcyclist that crashes or is forced off the road may be out of view of other drivers, and as a result, may not be rescued for some time. This delay often results in harm to the rider, particularly in situations where urgent medical treatment is needed.

Over the past several years, many innovations have been made to minimize the dangers to motorcycle riders. For instance, U.S. patent application No. 2003/0213045A1 for an invention entitled "High Visibility Safety Garment" discloses a high-visibility garment intended to provide increased safety to a person wearing the garment. The device includes an array of lights, is controlled by a remote transmitter, and powered by a portable battery pack. This device, however, is rather bulky, and requires that the cycle rider wear that particular piece of apparel, namely, a jacket.

Another motorcycle safety measure is disclosed in U.S. Pat. No. 4,760,373 for an invention entitled "Motorcycle Helmet Containing an Automatic Brake Light." This lighting device is controlled by a transmitter in electrical contact with the motorcycle electrical circuits, or in physical contact with the brake levers, and provides a radio-frequency control signal to a remote light mounted to the helmet.

A similar helmet-mounted device is disclosed in U.S. Pat. No. 6,406,168 for an invention entitled "Helmet Mounted Brake Lights." This device includes a transmitter having a microprocessor that receives an input from a motorcycle and in response, generates a signal to be received by a remote lighting element. Similarly, U.S. Pat. No. 6,686,837 for an invention entitled "Brake Light Control System for a Motorcycle" discloses a safety light module for attaching to a helmet. This device includes a companion transmitter which, when connected to a motorcycle's circuitry, generates a series of light control signals to activate the helmet light module.

These helmet-mounted devices, however, fail to account for the need for direction-indicating light signals, and also do not provide for the easy customization or modification of the lighting system as the safety needs for a rider may change.

For instance, while riding primarily on the freeway, a rider may wish to have an increased number of front and rear facing lighting elements. On the other hand, while riding in city environments, a rider may wish to have a greater number of side-facing lighting elements, an audible signal, or a combination of those signals.

In light of the above, it would be advantageous to provide a vehicle safety lighting system capable of increasing the visibility of motorcycle riders. It would also be advantageous to provide a vehicle safety lighting system that is adaptable to each user's unique lighting requirements, and that is easily reconfigurable as lighting requirements may change. It is further advantageous to provide a vehicle safety lighting system that is easy to use, relatively easy to manufacture, and comparatively cost effective.

SUMMARY OF THE INVENTION

The present invention is typically used in conjunction with a typical motorcycle and rider. The vehicle safety lighting system of the present invention includes a transmitting unit and multiple remote receiving units, each having a lighting and audible element, and that receive signals from the transmitting unit and selectively illuminate its lighting elements according to a predetermined lighting response directed by the transmitting unit. The receiving unit includes a central processor that selectively decodes transmitted signals received from the transmitting unit and provides signals to a driver circuit that activate a visual signal, and audible signal, or both.

The present invention includes removable signals which may include a band that is expandable for positioning about a cycle riders' arm or leg, and includes a lighting element controlled by a receiving unit that receives signals from the transmitting unit and activates the lighting element in response to predetermined signals. Alternatively, the removable signal may be attached directly to the riders' clothing using a variety of methods, or may be integral to the cycle itself, such as those devices being incorporated directly into a cycle during the manufacturing process. Removable signals may be built directly into the motorcycle suits, jackets, and helmets at time of manufacture. These removable signals may be clipped or attached to a base. The base may be accompanied by a band or may be affixed to clothing or other items through a variety of methods. A base may be sewn, glued, or riveted into clothing, helmets, saddle bags, etc.

An alternative embodiment of the removable signal may include a band for positioning about a cycle riders' arm, wrist, shoulder or leg, and may includes a side lighting element, a front lighting element, and a back lighting element, with each of these elements is controlled by a receiving unit that receives signals from the transmitting unit and activates one, two, or all of the lighting elements in response to predetermined signals. Additionally, a removable signal may have a band with an integral base, and a signal that is detachable from the base for charging, replacing and/or programming.

In order to facilitate the continual charging of the removable signals for the present invention, a charging base may be provided and formed with a number of charging bays for removably inserting the removable signal into one such bay which establish electrical contact with the charger base to charge the rechargeable battery within the removable signal.

Alternatively, the removable signals may be designed in a manner in which they can be electrically linked, or physically attached together, for easy simultaneous charging. This would eliminate the need for a charging station which would be inconvenient to carry on some motorcycles. A charging cable may be used for on-bike charging.

The particular operation of the lighting elements and audible signal device may be predetermined at the time of manufacturing of the vehicle safety lighting system. Alternatively, the operation of the vehicle safety lighting system may be customized by the rider, or may be updated by accessing manufacturers information from a computer network, or may be modified based upon the rider's own preferences and riding habits.

A network cable may be used to network the main processor/transmitter to a PC or laptop for programming a user's preferences. Another option would be to utilize an ejectable solid state data storage card (e.g. Flash Memory card) where settings are preprogrammed by the user on a home computer. The Flash Memory card containing user preferences would then be inserted/loaded into the main processor/transmitter. One other feature of this invention is a manual switch selector that could be used to manually select the functionality of each signal device.

There is a growing trend among sport bikers where they dislike the awkward appearance that bulky protruding signals give to their motorcycles. Hence, they remove the bulky signals to give a more stylish and sleek appearance to their motorcycles. Harley riders prefer the black leather look accompanied with shiny chrome. Such riders would not be attracted to bright safety garments or bulky attachments. The present invention is adaptable to most styles and trends.

BRIEF DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which.

DETAILED DESCRIPTION

Figure 1:
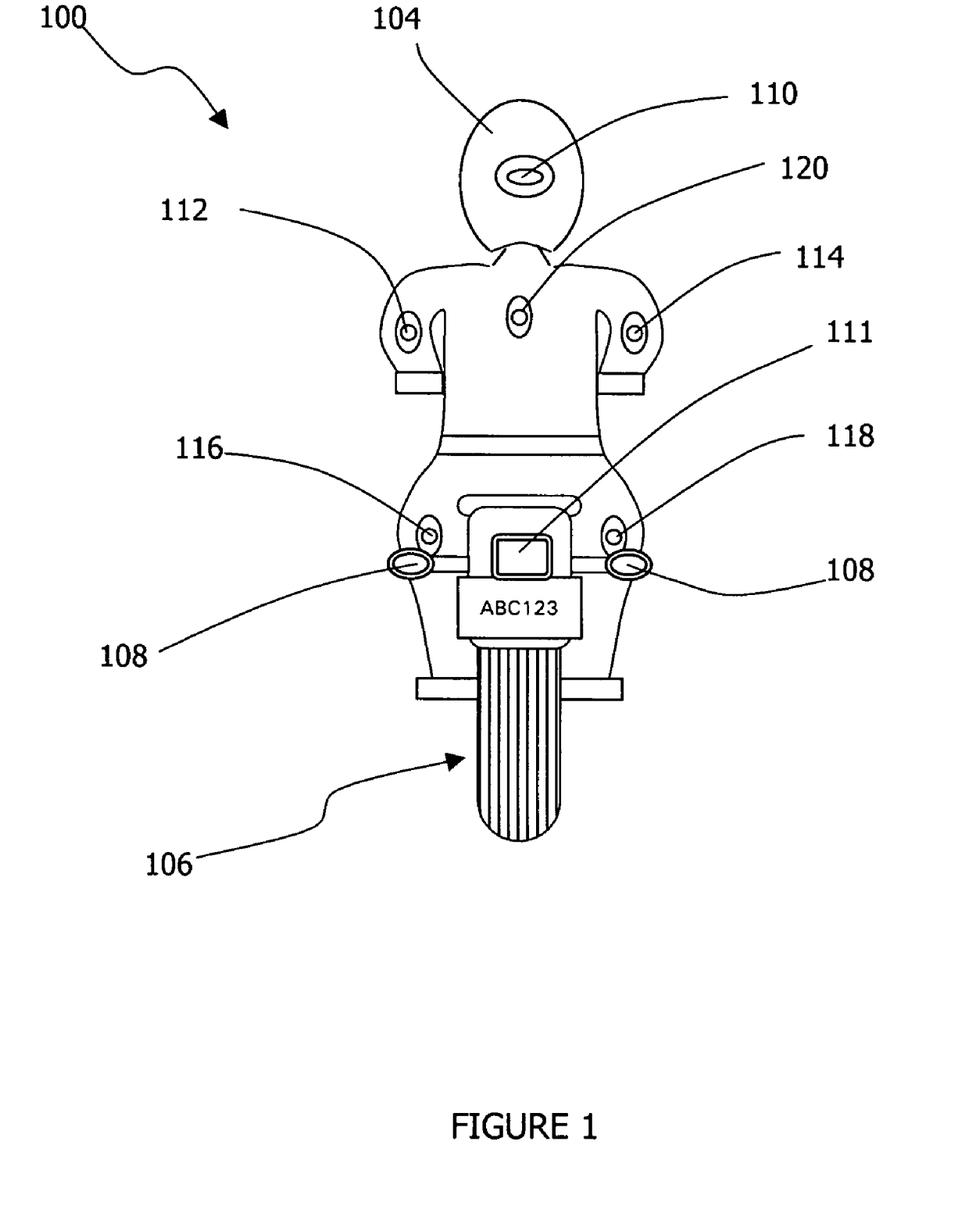
FIG. 1 is a back side view of a typical motorcycle and rider equipped with the vehicle safety lighting system of the present invention showing the placement of various remote receiving units attached to the rider, the rider's helmet, and the cycle itself (i.e. saddle bags, side faring)to provide for the added safety of the rider and cycle by the predetermined illumination and sounding of signal devices made in response to activities in the cycle, such as turning, braking, or direct activation of the system by the rider.

Referring initially to FIG. 1, a back view of a typical motorcycle and rider equipped with the vehicle safety lighting system of the present invention is shown and generally designated 100. Vehicle safety lighting system 100, in a preferred embodiment, is typically placed on a cycle rider 102 having a helmet 104, and riding a motorcycle 106 with standard directional indicator lights 108 and stop light 111. More specifically, a remote receiving unit 110 having a lighting element may be placed on helmet 104, and additional remote receiving units 112, 114, 116, 118 and 120 may be attached to the rider's left arm, right arm, left leg, right let, and back, respectively.

It is to be appreciated that the addition of various remote receiving units of the present invention to the rider, the rider's helmet, and the cycle itself, provide for the added safety of the rider and cycle. As will be discussed in greater detail below, the selective and predetermined illumination and sounding of the remote receiving units made in response to activities in the cycle, such as turning, braking, or direct activation of the system by the rider, will provide additional safety to the rider.

Figure 2A:
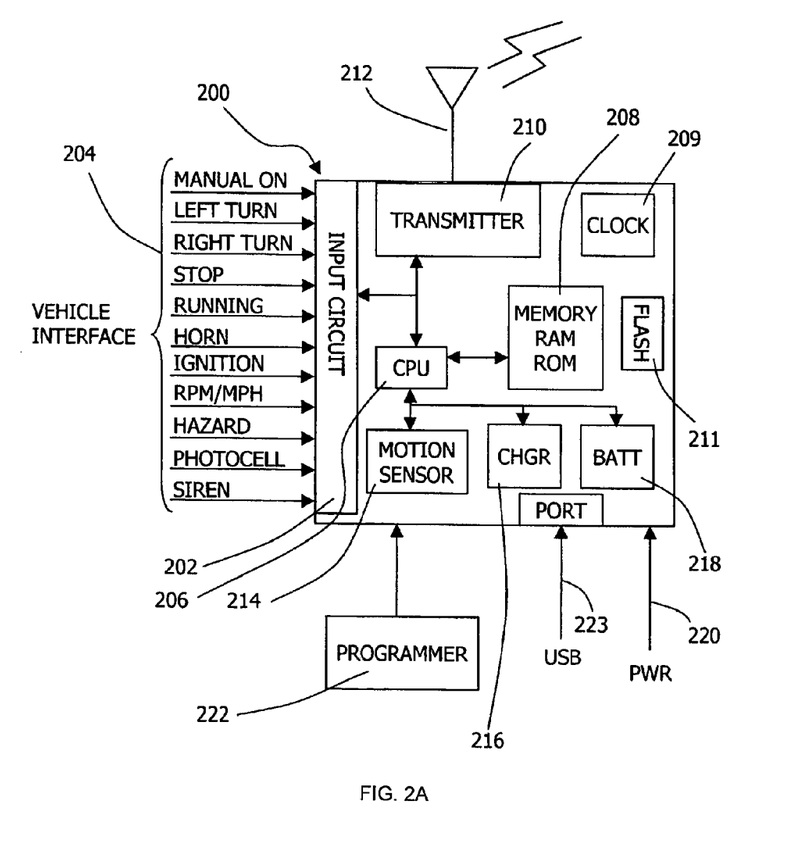
FIG. 2A is a block diagram of the vehicle safety lighting system showing the transmitting unit and its integral components.
Figure 2B:
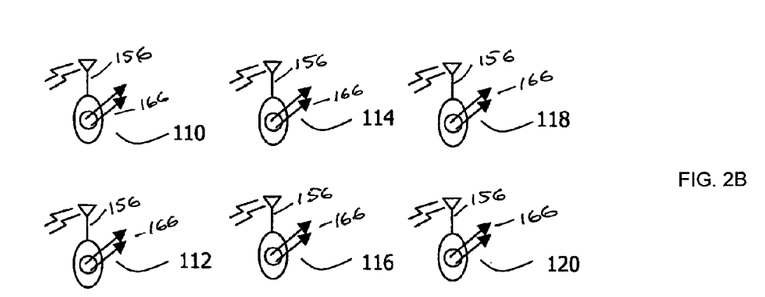
FIG. 2B is a block diagram illustrating a collection of remote receiving or signal units that receive signals from the transmitting unit of FIG. 2A and selectively illuminate lighting and audio elements according to a predetermined lighting response directed by the transmitting unit.

FIGS. 2A and 2B, a block diagram of the vehicle safety lighting system of the present invention is shown. The vehicle safety lighting system in one embodiment comprises a transmitting unit 200 which is illustrated in FIG. 2A and a number of remote receiving units or signal units 110, 112, 114, 116, 118, and 120 as illustrated in FIG. 2B that receive radio frequency control signals from the transmitting unit. Transmitting unit 200 includes an input circuit 202 designed to receive various electronic signals from a vehicle interface 204. For instance, vehicle interface 204 may include a manual "on" switch to activate the remote receiving units on command, and it may receive typical inputs such as the left turn signal, right turn signal, stop light, running lights, hazard/emergency signal, and horn inputs, RPM/MPH inputs, photo cell or daylight sensor inputs. These inputs may be received in the input circuit 202 and provided to a central processing unit (CPU) 206.

CPU 206 is in communication with memory bank 208 that may include random access memory (RAM), read only memory (ROM) or a combination of memory types. Within this memory may be a look-up table as is known in the art to provide control to the CPU 206 when a particular input signal combination is received in input circuit 202.

In circumstances where the CPU determines that one or more remote receiving units is to be activated based on input signals to the input circuit 202, a transmitter 210 having an antenna 212 may be activated. As will be discussed in greater detail below in conjunction with FIG. 3, various electronic signals may be generated by transmitter 210 so as to identify a control signal to a particular receiving unit.

A programmable clock/timer unit 230 may be provided as an additional means of controlling when the running lights may function. For example, the operator may desire the removable signals to function as running lights only in the evening hours (5 PM-6 AM) and not daytime hours (6 AM-5 PM). Depending on the geographic location, and daylight savings, the operator will be able to program the times in which certain features (audible or light signals) may function. An advantage to controlling a running light feature would be to conserve battery life in the removable signals.

A motion sensor 214 may be provided to allow the transmitting unit 200 to determine the occurrence of certain events, such as a crash of the motorcycle, completion of a turn, and the like. Motion sensor 214 may be provided to allow the transmitting unit 210 to determine when the vehicle is in motion. For example, the audible signals may function only when the motorcycle is in a certain motion, such as a forward moving motion. The operator may feel that audible signals are not necessary while the motorcycle is stopped, waiting in a left turn lane. However, the operator may feel it most necessary to have the audible signals function during a moving lane change.

The motion sensor may be used to detect when the motorcycle is in a turn or has completed a turn. The transmitter may be programmed to turn the signal devices on or off in such situations, depending on the user's programming. The motion sensor may also be used to detect when the motorcycle has crashed or is in a laid down position (indicating that the motorcycle has crashed and come to a stop on its side). The transmitting unit would then simultaneously flash all light and audible signals.

Transmitting unit 200 is also equipped with a battery charger 216 that may be used to charge the battery 218 internal to the transmitting unit. Also, power input 220 may be connected to the cycle power in order to eliminate the need for cycle power, or to provide the necessary power to recharge the battery 218. This may serve as a back-up power source, in the event that the motorcycles main power source is disengaged or somehow disconnected. The back-up power will continue to transmit an emergency signal (if the cycle is laid down or involved in an accident)

Figure 3:
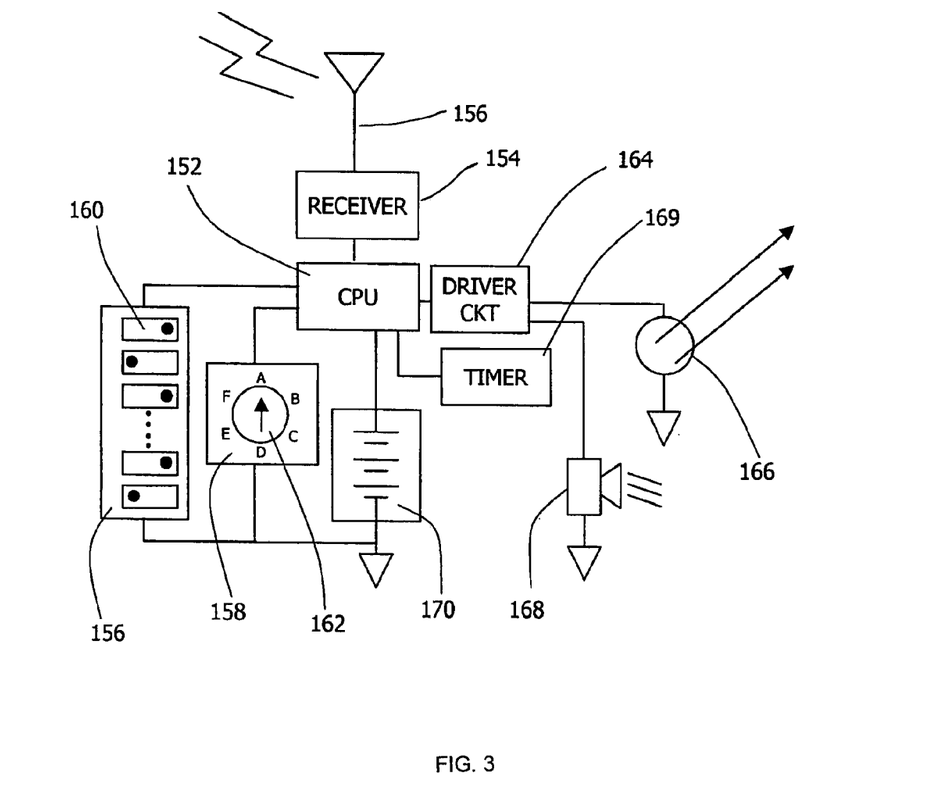
FIG. 3 is a block diagram of an exemplary receiving unit of the vehicle safety lighting system of the present invention, showing a central processor that selectively decodes transmitted signals received from the transmitting unit and provides signals to a driver circuit that activate a visual signal, and audible signal, or both.

FIG. 3 illustrates a block diagram of one embodiment of a receiving or signal unit 110, 112, 114, 116, 118, or 120 of FIG. 2B. The signal unit includes a central processor 152 that receives with receiver 154 and antenna 156 signals from the transmitting unit 200. Central processor 152 selectively decodes transmitted signals received from the transmitting unit 200 This decoding is facilitated with a binary serial number selector 156 and a channel code selector 158. The binary serial numer selector 156 contains a number of binary selection seitches that may be set to uniquely identify the signal unit, and the channel coed selector 158 may be used to select the radio frequency (RF) channel upon which the receiver 154 receives its signals.

A driver circuit 164 receives control from CPU 152 and in turn, activates a visual signal 166, such as a light source, an audible signal 168, such as a piezo transducer, or both. A vibration generator may also be used in order to alert the rider that the device is activated. For example, in the event a signal is activated, it may vibrate to notify the rider. Also, the driver circuit may activate the vibration generator if the signal is on for a period of time longer than a pre-set period in order to remind the rider it is activated. Vibrating signal may also inform the user of when the batteries in the unit are low and need to be recharged.

In a preferred embodiment, lighting elements 166 are light emitting diodes (LEDs), or more specifically, "Ultra Bright LED's". Because LEDs require minimal power to operate and provide for a longer life, the present invention is likely to use LED's, but it is not limited to LED's for a light source.

Figure 4:
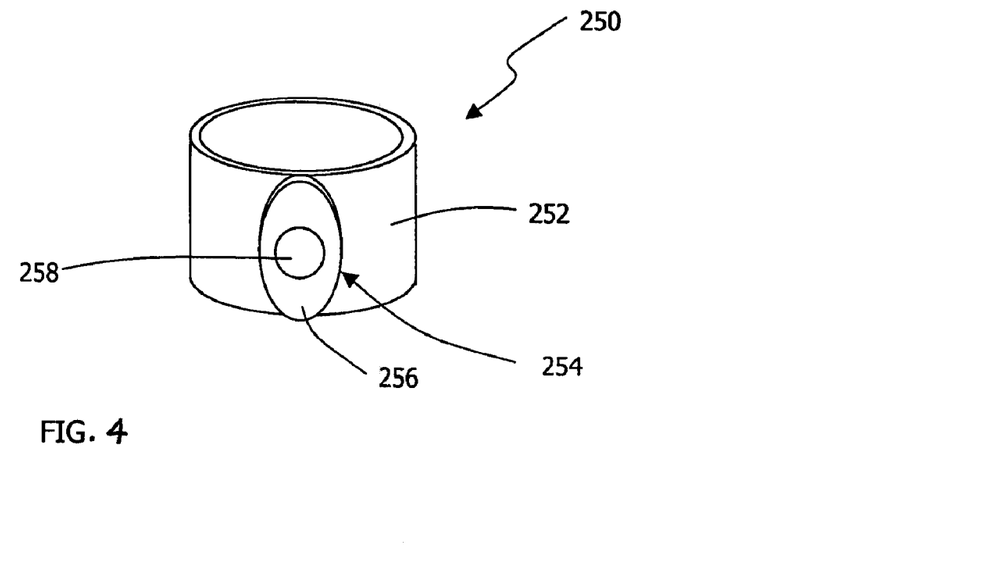
FIG. 4 is a perspective view of a removable signal for use in the vehicle safety lighting system of the present invention, and includes a band that is expandable for positioning about a cycle riders' arm or leg, and includes a lighting element controlled by a receiving unit that receives signals from the transmitting unit and activates the lighting element in response to predetermined signals.

Referring now to FIG. 4, a perspective view of a removable signal unit for use in the vehicle safety lighting system of the present invention is shown and generally designated 250. Signal unit 250 includes a band 252 that is expandable for positioning about a cycle riders' arm or leg (not shown this Figure), and includes a remote receiving unit 254 having a lighting element 256 controlled by a receiver and central processing unit as illustrated in FIG. 3 (not shown this Figure) that receives signals from the transmitting unit and activates the lighting source 258 in response to predetermined signals.

Removable signal 250 is to be worn on the exterior and subject to the elements. As a result, the removable signal is durable in construction, weather proof and/or substantially waterproof and designed to operate even in rain, fog, hail, etc.

Figure 5A:
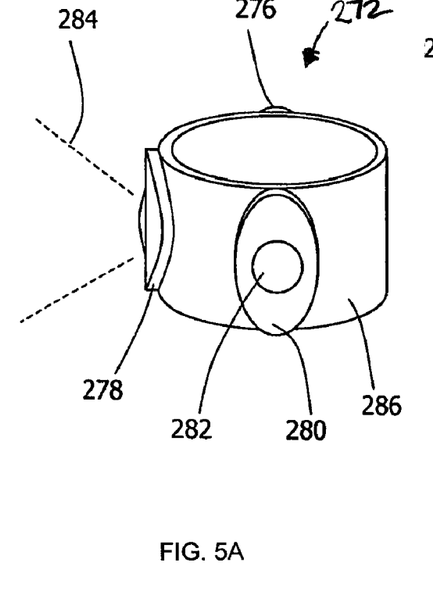
FIGS. 5A and 5B are perspective views illustrating one embodiment of a pair of removable signal units that are for use in the vehicle safety lighting system of FIG. 1 to 4.
Figure 5B:
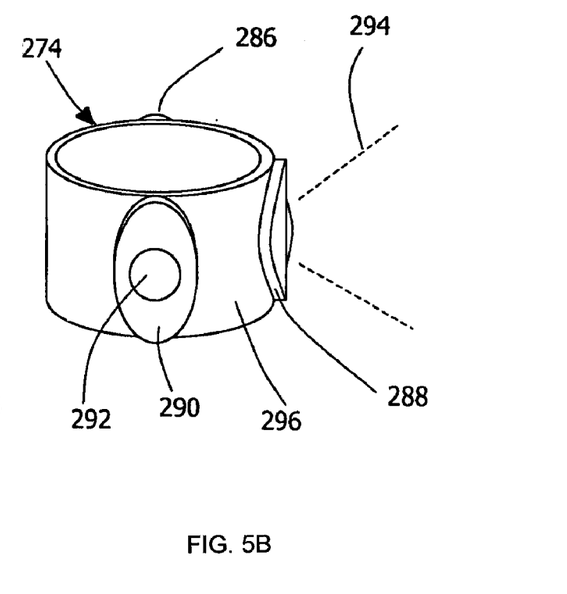

FIGS. 5A and 5B are perspective views of a pair of removable signal units 272 and 274 that are for use in the vehicle safety lighting system 100 of the present invention. More specifically, removable signal units 272 and 274 are for left and right hand use. Each signal unit has a band 286, 296 for positioning the signal unit about a cycle rider's arm or leg. As illustrated in FIG. 5A, signal signal unit 272 includes a front lighting element 276, a left side lighting element 278, and a back lighting element 280, with each of these elements 276, 278, 280, each having a light source 282 generating a visible light beam 284 and being controlled by a receiver as indicated in FIG. 2B and 3 that receives signals from the transmitting unit and activates one, two, or all of the lighting elements in response to predetermined signals. Similarly, as illustrated in FIG. 5B, right signal unit 274 includes a front lighting element 286, a right side lighting element 288, a back lighting element 290 each having a light source 292 generating a visible light beam 294.

Control of the lighting elements shown in FIGS. 5A and 5B may be predetermined to provide a running light effect for the forward-facing lighting elements, a turn signal indicator for the side-facing lighting elements, and a stop-light effect for the rear-facing lighting elements. However, it is to be appreciated that different features may be implemented in the present invention to provide a custom safety feature to any cycle and rider, and may be customized further for day or night riding conditions.

Figure 6A:
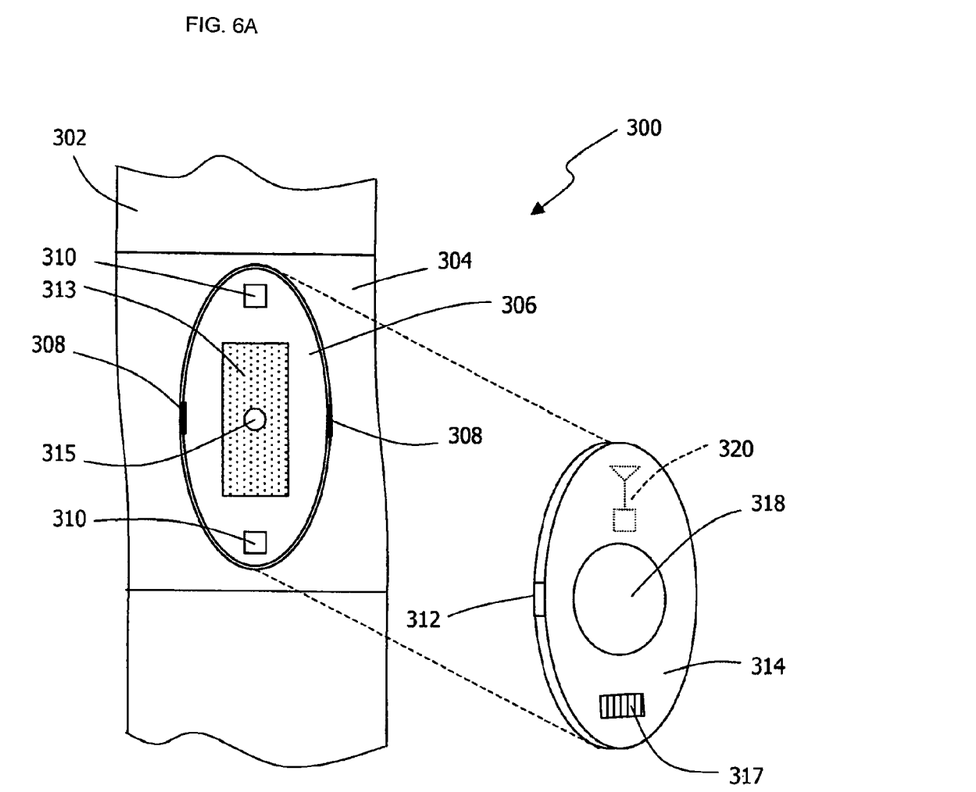
FIG. 6A is a perspective view of an embodiment of a signal unit which has a removable signal device shown detached from the base of the signal unit for charging.
Figure 6B:
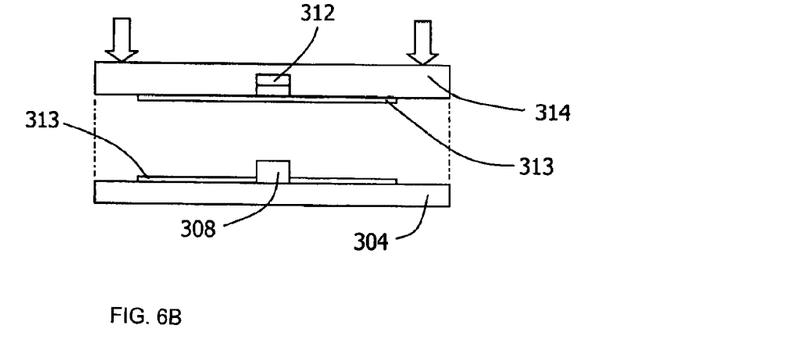
FIG. 6B is a side elevation view illustrating the signal device aligned with the base of FIG. 6A, illustrating clips on the base which engage with aligned notches on the signal device when the signal device is engaged with the base.

FIGS. 6A and 6B illustrate another removable signal or signal unit 300 adapted to be placed on the arm or leg 302 of a user. Removable signal unit 300 may have a fastener for releasably fastening body 305 to base 306. Removable signal unit 300 includes an expandable band or strap 304 intended for engagement over an arm or leg 302 and having an integral base 306 that is formed with a pair of side clips 308 for receiving and holding secure a signal body 305. The signal body 305 may be formed with cooperating notches 312 for being received in side clips 308, as best seen in FIG. 6B.

It should be noted that the base 306 may be fitted directly into clothing or items during manufacturing. The base 306 may also be added to clothing or related items through various methods. For example, an operator may wish to retrofit his/her current motorcycle suit with the detachable signal devices by sewing, gluing, or riveting the base 306 directly to the suit. The operator can then detach and reattach signal bodies to his/her suit by having a base 306 fitted into the suit. Additionally, the base 306 may be specifically designed to hold a certain type of signal. An example of this would be that left signals will fit only into a base that is molded or fitted specifically for a left signal. A right side signal body would then not be able to fit or attach to a left side base.

In addition to side clips 308, or as an alternative thereto, fasteners may provide for the attachment of body 305 to base 306. For instance, magnetic elements 310 may be formed in base 306 that engage a metallic body of body 305, or corresponding magnetic elements formed in the body 305. In this manner, body 305 may be secured to base 306 for use, and easily removed for storage and recharging of the removable signal during periods of nonuse.

A variety of additional methods of attachment may be implemented without departing from the spirit and scope of the present invention. For example, Velcro 313, or snap 315 may be used. Alternatively, a sleeve may be presented to receive a signal device by sliding the signal into a corresponding sleeve.

A receiving unit 320 is contained within body 305 to receive and decode the RF signals from transmitting unit (discussed above), and provides the control for the signal light 318 on the face 314 of body 305. An audible signal 317 may be positioned on signal 305 to provide an audio signal in addition, or alternative to, signal light 318. In a preferred embodiment, audible signal 317 may sound simultaneously with visual signal 318, or it may be activated separately.

Figure 7:
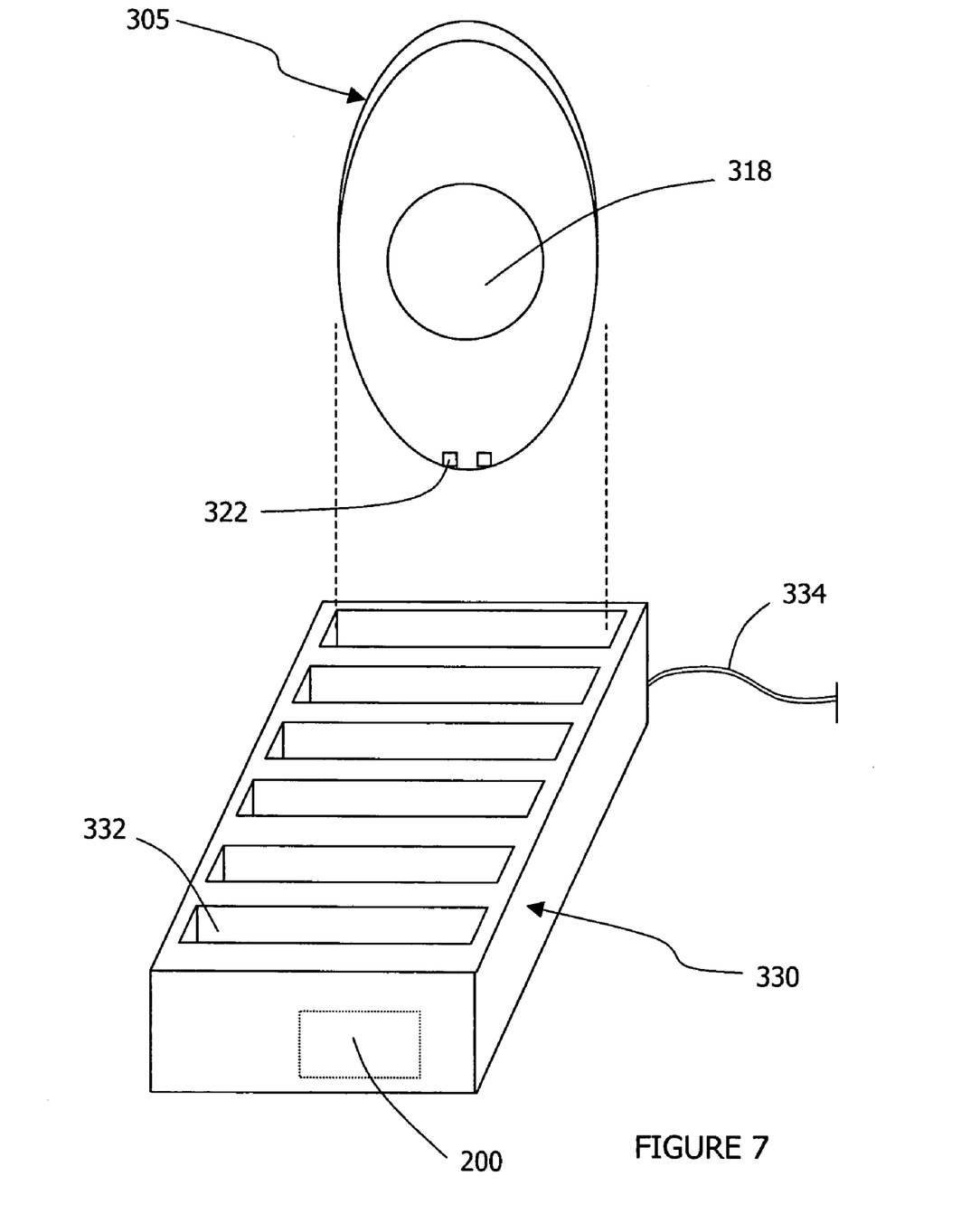
FIG. 7 is a perspective view of a charging base for use with the vehicle safety lighting system of the present invention, having a number of charging bays and an exemplary removable signal shown insertable into one such bay and formed with a pair of charging contacts which establish electrical contact with the charger base to charge the rechargeable battery within the removable signal; Show an additional Figure of "interlocking devices" or a quick interlocking system for convenient charging.

A charging system is shown in FIG. 7, and is generally designated 330. In a preferred embodiment, charging system 330 includes a number of charging bays 332 sized to receive a removable signal body 305. Charging system 330 may also be formed with the transmitting unit 200 (shown in dashed lines) and may receive input from the cycle power 334, or may be separate from the cycle, such as in the home of the rider. In any circumstance, the charging system 330 receives multiple removable signal bodies 305 for simultaneous storage and charging ensuring that the units are ready for use. A pair of charging contacts 322 may be provided to facilitate the charging of the removable signal 300 from charging system 330

Figure 8:
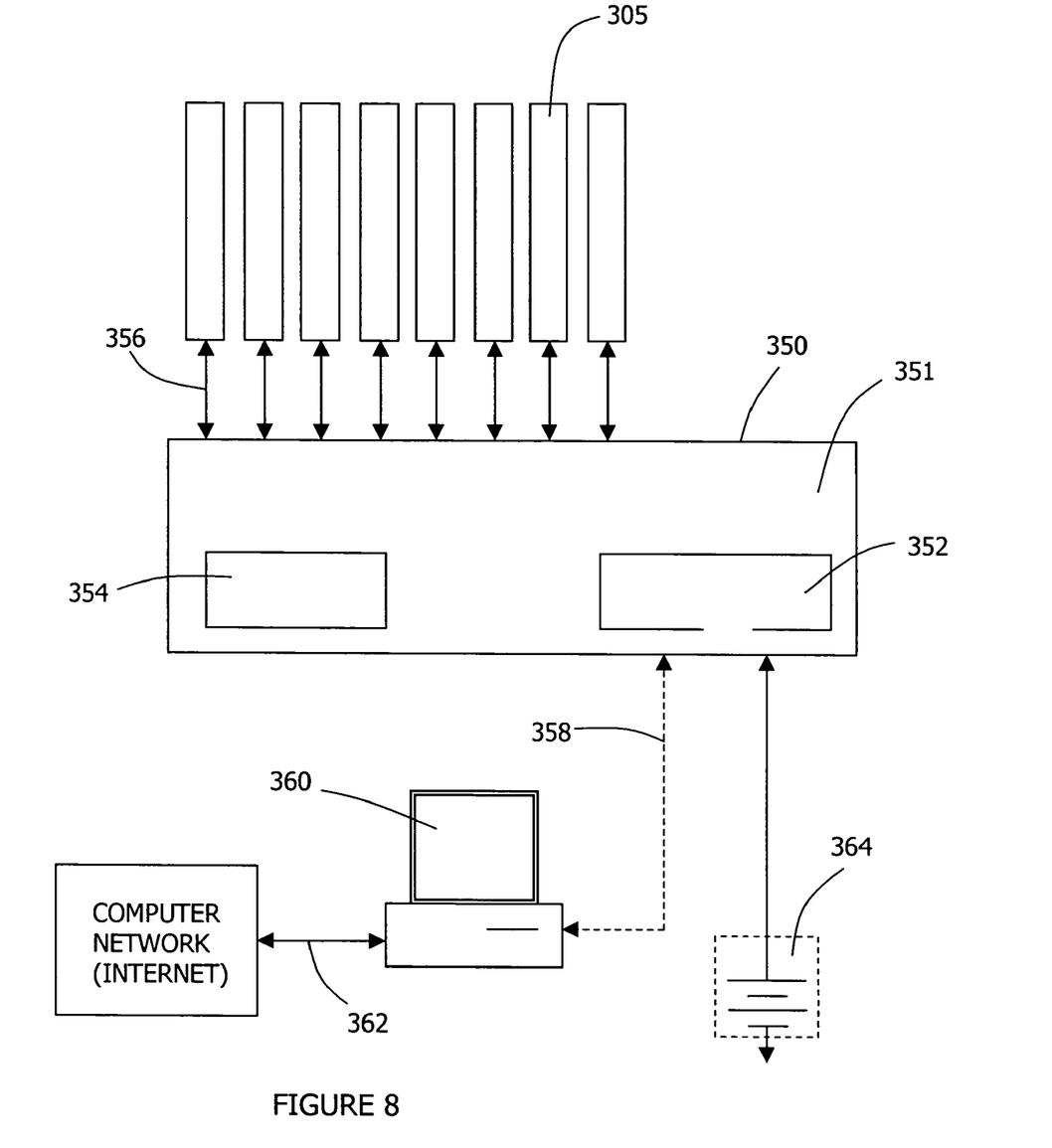
FIG. 8 is a block diagram of a programming system of the vehicle safety lighting system of the present invention showing a number of removable signals in communication with a programming base having an interface for connection to a computer system, and for accessing a computer network, along with memory devices for storing commonly used transmitting and receiving protocols and for devising new protocols for specific signaling requirements.

Referring now to FIG. 8, a block diagram of a programming system 350 of the vehicle safety lighting system 100 of the present invention includes a number of removable signals 305 in communication with a programming base 351 having an interface 358 for connection to a computer system 360, and for accessing a computer network 362. Programming base 351 includes memory devices 352 and 354 for storing commonly used transmitting and receiving protocols and for devising new protocols for specific signaling requirements. A user of the present invention may use the computer system 360 to uniquely program the operation of the present invention, and to provide customization to the system. Also, by providing access to the computer network, such as the Internet, it is possible to update the control of the system of the present invention. A separate battery source 364 may be provided that powers the programming system 350, or it may secure direct power from the cycle 106, or from a typical AC source.

Figure 9:
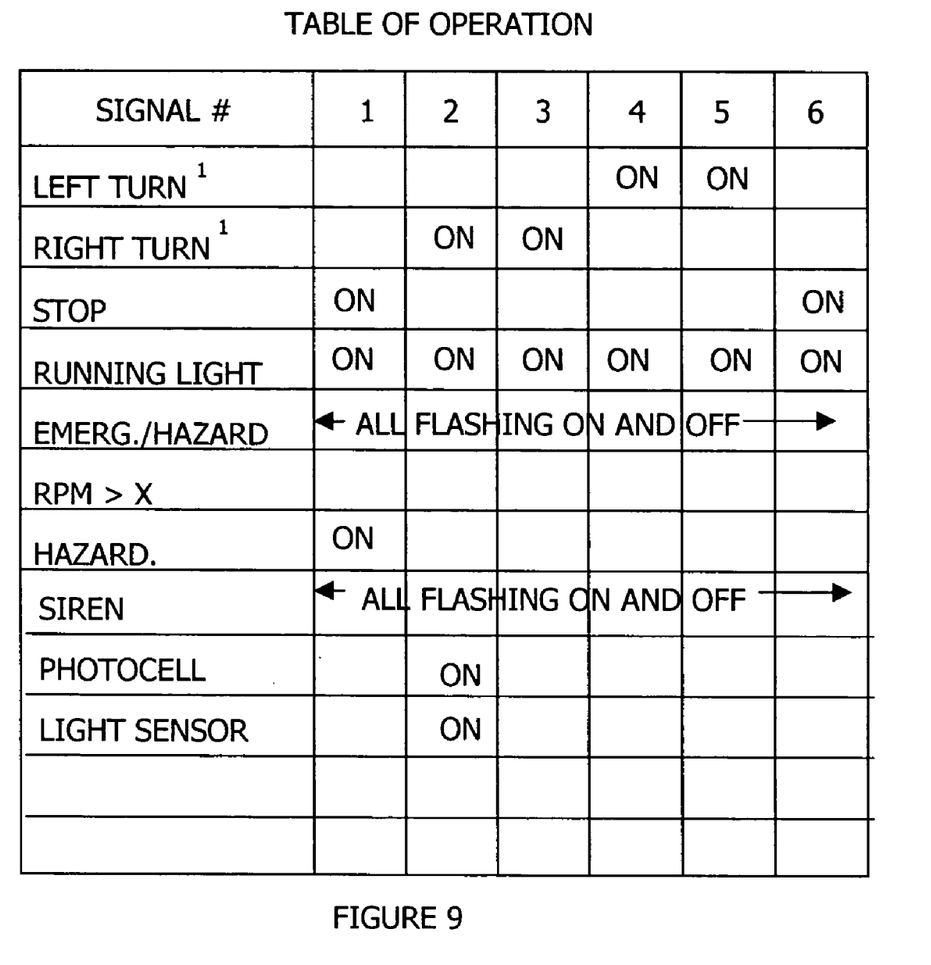
FIG. 9 is an exemplary Table of Operation for the operation of the vehicle safety lighting system of the present invention showing the operation of the lighting element and audible signal in response to control inputs from the cycle and the rider.

FIG. 9 includes an exemplary Table of Operation for the operation of the vehicle safety lighting system of the present invention showing the operation of the lighting element and audible signal in response to control inputs from the cycle and the rider. In a preferred embodiment, the operation of the present invention may be pre-determined from combinations of the input signals from the cycle 106. When the left or right turn indicators for the cycle are activated, the corresponding lighting and/or audible elements of the present invention may be activated. Similarly, when the brake is applied to the cycle, the lighting elements facing rearwards may be activated.

Figure 10:
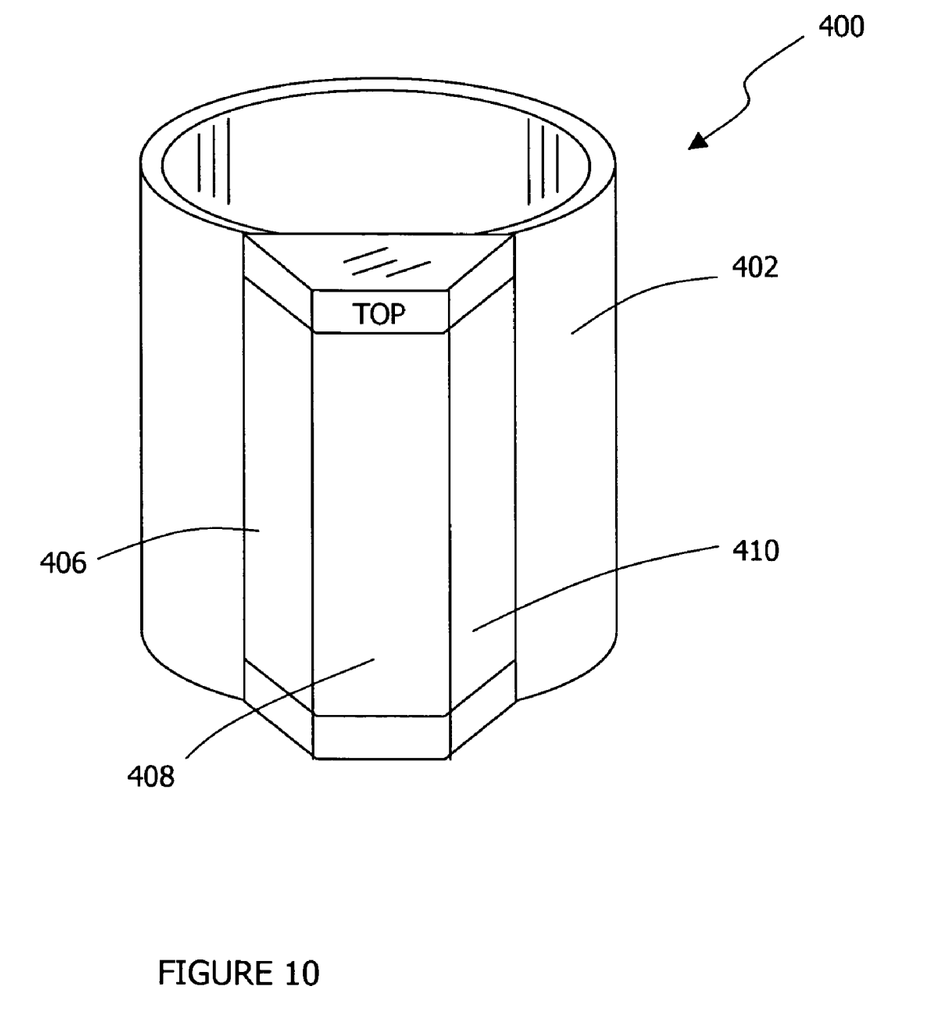
FIG. 10 is a perspective view of a removable signal that are for use in the vehicle safety lighting system of the present invention and includes a band for positioning about a cycle riders' arm or leg, and includes a three-sided lighting element with each of these three elements controlled by a receiving unit that receives signals from the transmitting unit and activates one, two, or all of the lighting elements in response to predetermined signals.

Referring now to FIG. 10, a perspective view of an alternative embodiment of a removable signal of the present invention is shown and generally designated 400. Removable signal 400 includes a band 402 for positioning about a cycle riders' arm or leg, and includes a three-sided lighting element 404 having lighting panels 406, 408, and 410 which may be individually controlled by a receiving unit (not shown this Figure) that receives signals from the transmitting unit and activates one, two, or all of the lighting elements in response to predetermined signals.

Signals 400 may be designed specifically to be worn only on the left or right side of a rider. For instance, a signal intended to be worn on the left side of the rider may have only fasteners that attach to the bands worn on the left side of the rider. Similarly, a signal intended to be worn on the right side of the rider may have only fasteners that attach to the bands worn on the right side of the rider. Alternatively, in situations where the signal has a front, back and side, it may be suitable to provide visual position indicators, such as a "Left" or "Right" indicator directly on the signal.

The present invention can be applied to supplement law enforcement motorcycle officers. The signal devices can be a combination of bright LED or strobe-flashing type lighting. During a traffic stop, the signals attached to the officer's uniform may flash or strobe flash to increase the officers' visibility on a busy street or highway.

Figure 11:
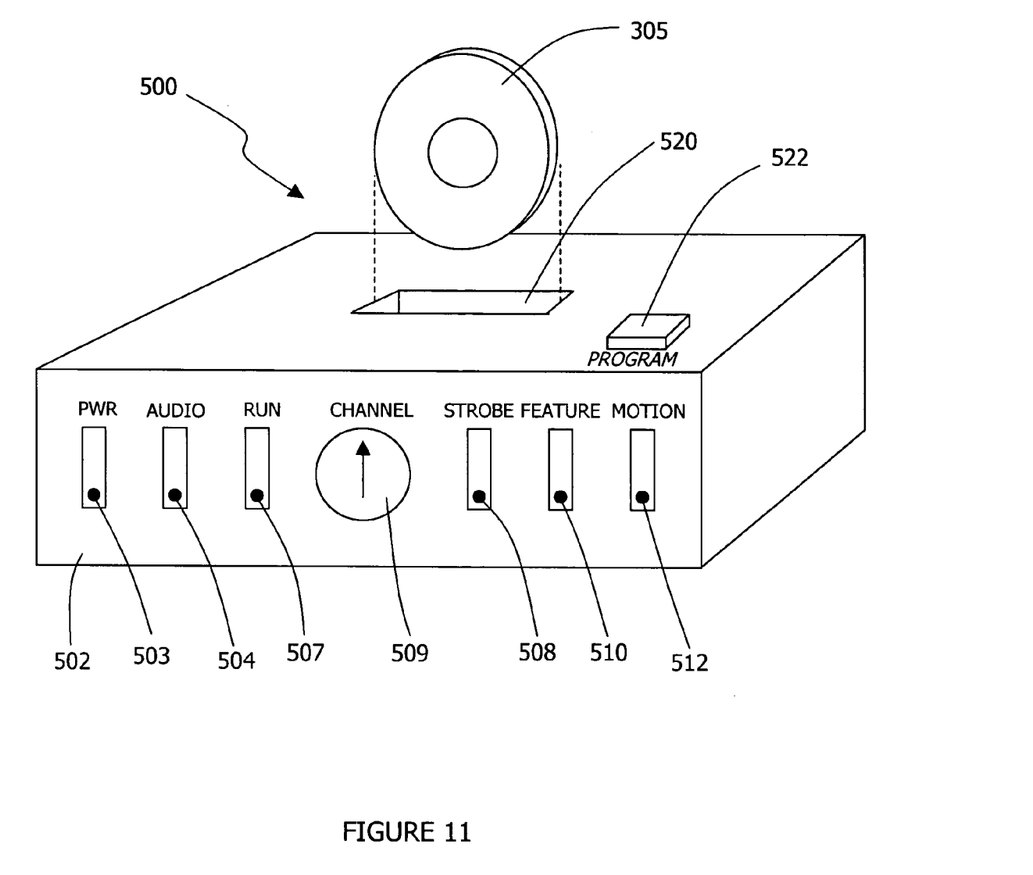
FIG. 11 is a diagram example of a manual switch board for the manual programming of the transmitting station of the vehicle safety lighting system by the user, and may be used to program functions into each of the remote receiving units.

Referring now to FIG. 11, an alternative embodiment of the vehicle safety lighting system of the present invention is shown and generally designated 500. System 500 includes a manual control station that is accessible to the rider of a vehicle to control the function of the several remote signal devices. A face plate 502 may be equipped with manual switches 504, 506, 508, 510 and 512 that control the operation of the audio signal, running lights, strobe feature, miscellaneous feature, motion sensor features, respectively. It is to be appreciated, however, that switches 504-512 may be designated to control any feature within the present invention, and those features depicted are merely exemplary of a preferred embodiment.

The manual control station may also be equipped with a charging and programming bay 520 to receive a signal device, such as signal 305. In such an application of the present invention, a signal 305 may be positioned within bay 520, the switches set to a desired combination, and a programming button 522 pressed to initiate the programming of the signal 305 to operate in accordance with the switched selections. The programming bay 520 is an optional feature to the manual control station of the present invention, and may or may not be necessary to the programming of various signals 305.

Figure 12:
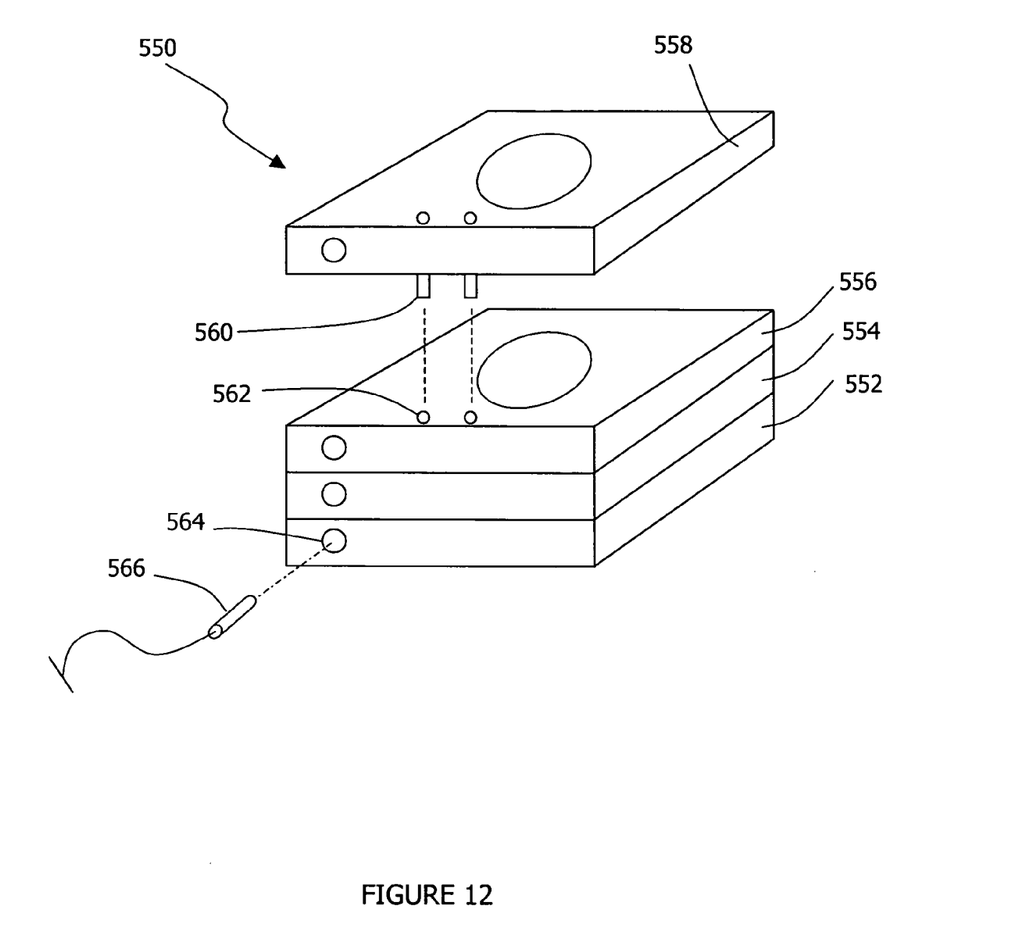
FIG. 12 is a perspective view of an alternative method of charging the remote receivers of the vehicle safety lighting system of the present invention showing the interconnection and/or interlocking assembly of multiple remote receivers.

Referring now to FIG. 12, a perspective view of an alternative method of charging the remote receivers of the vehicle safety lighting system of the present invention is shown and generally designated 550. System 550 includes a number of signal devices 552, 554, 556, and 558 shown in a stacked configuration wherein a charging pin 560 on the body of the signal device, is aligned with a charging port 562 of the adjacent signal device. In this manner, one or more of the signal devices may be equipped with a charging input port 564 that receives a charging plug 566, and the interconnection between the several signal devices provides for the distribution of a charging current to each of the signal devices.

Figure 13A:
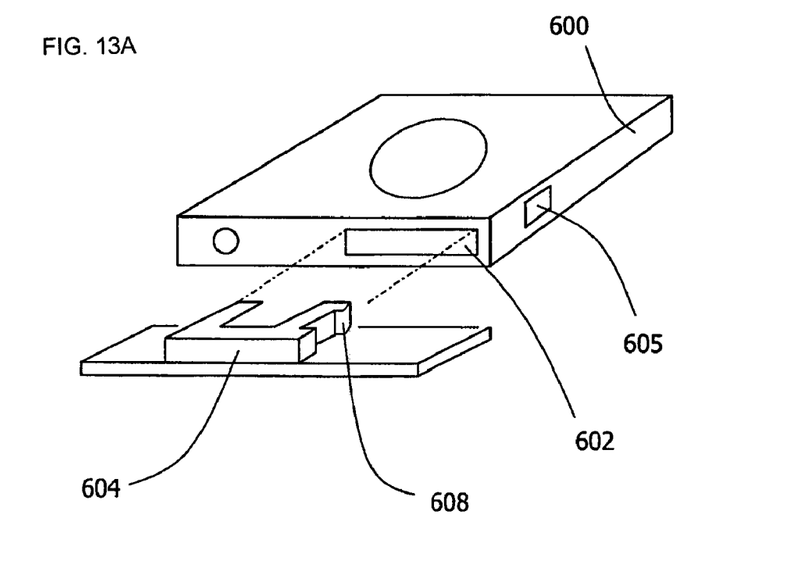
FIG. 13A illustrates one embodiment of a fastening mechanism for attaching a signal device to a rider.
Figure 13B:
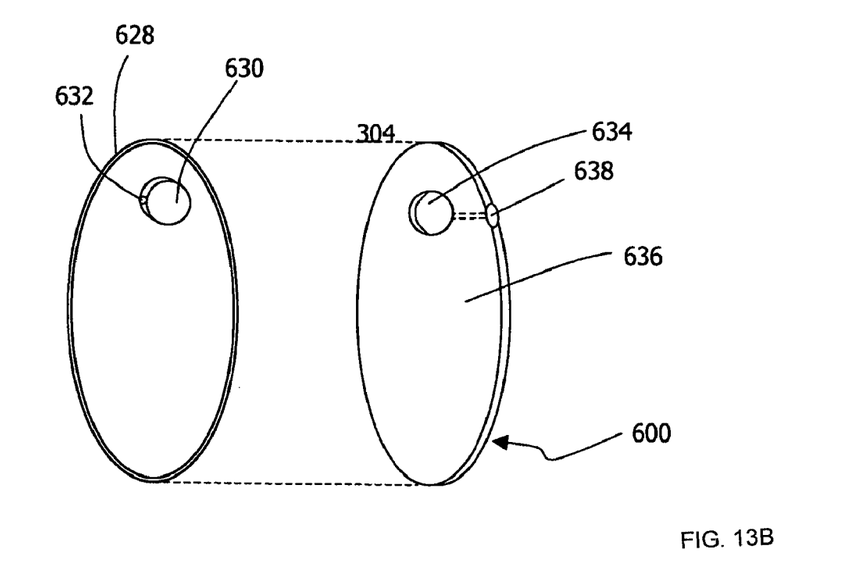
FIG. 13B illustrates an other embodiment of a fastening mechanism for attaching a signal device to a rider.

FIGS. 13A and 13B illustrate two alternative embodiments of fasteners for attaching signal units to a rider. For example, a body 600 may be formed with a slot 602 to receive a spring clip 604, as illustrated in FIG. 13A. The clip 604 may be inserted into slot 602 to secure the body 600 to the rider. When desired, the body 600 may be removed by depressing the tab 608 and sliding the body off of the clip.

Alternatively, as illustrated in FIG. 13B, a bearing tab may be used to secure the body to the rider. More specifically, a base 628 formed with a post 630 having a spring-loaded tab 632 may be attached to the rider. A signal device 636 is formed with a receptacle 634 with an actuator 638. The signal device 636 may be attached to the base 628 by placing the post 630 into receptacle 634 wherein the spring loaded tab 632 retains the two parts together. To remove the signal device 636 from the base 628, actuator 638 is pressed to in turn depress the spring-loaded tab 632.

Figure 14:
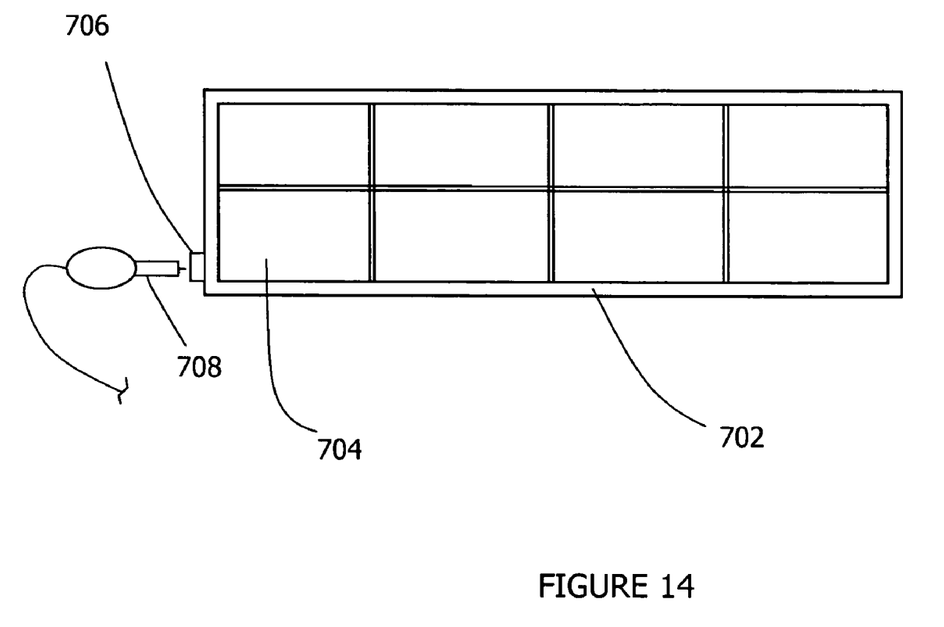
FIG. 14 is a top view of an alternative embodiment of a quick-charging system showing the placement of a number of signals of the present invention within a rubber or plastic sleeve.

Referring now to FIG. 14, a top view of an alternative embodiment of a quick-charging system of the present invention is shown and generally designated 700. Device 700 includes a sleeve 702 having a number of remote signals 704 positioned therein. The signal devices may slide into a compact sleeve for quick charging and convenient compact storage of the signal devices directly on the cycle.

As shown, the configuration is a series of pairs of signals 704, however, it is to be appreciated that several other configurations may be implemented without departing from the present invention. An electrical connection port 706 is formed in the sleeve 702 to receive a plug 708 that provides electrical input to system 700 for charging the remote signals 704. Once the signals 704 are installed in sleeve 702, each signal 704 receives a charging current from plug 708 for charging.

While the vehicle safety lighting system as herein shown and disclosed in detail is fully capable of obtaining the objects and providing the advantages herein before stated, it is to be understood that it is merely illustrative of the presently preferred embodiments of the invention and that no limitations are intended to the details of use, construction or design herein shown other than as described in the appended claims.

I claim:

1. A vehicle safety lighting and signaling system, comprising:
   a transmitting unit associated with a vehicle interface module which provides vehicle status signals to the transmitting unit depending on vehicle conditions, the transmitting unit transmitting a plurality of unique control signals each corresponding to at least one predetermined vehicle status signal; and
   a plurality of separate signal units attached at a plurality of spaced locations on the rider of the vehicle, the signal units comprising at least right and left signal units which are attached to the right and left limbs of the rider, each having a receiver which receives control signals from the transmitting unit, a light source, and a control unit which decodes received control signals and actuates the light source when one or more predetermined control signals for the respective signal unit are received;
   whereby predetermined signal units are actuated depending on current vehicle conditions.

2. The vehicle safety lighting and signaling system of claim 1, wherein said transmitting unit further comprises: an input circuit which receives vehicle status signals from the vehicle interface indicating vehicle status; a central processing unit in communication with a memory bank and said input circuit; a transmitter in communication with said central processing unit; and wherein said transmitter transmits predetermined control signals dependent on received vehicle status signals.

3. The vehicle safety lighting and signaling system of claim 2 wherein said memory bank comprises a look-up table which provides control information to said central processing unit corresponding to a particular vehicle status output signal combination received in said input circuit, said central processing unit controlling said transmitter to transmit predetremined control signals depending on vehicle status signals received at said input circuit, whereby different control signals for actuating different signal units are transmitted depending on current vehicle conditions.

4. The vehicle safety lighting and signaling system of claim 2, further comprising a motion sensor in communication with said central processing unit wherein said motion sensor provides an input to said central processing unit to allow said transmitting unit to determine the movement status of the vehicle.

5. The vehicle safety lighting and signaling system of claim 2 wherein said transmitting unit further comprises a clock in communication with said transmitter which provides a timing control signal to control time periods during which control signals are transmitted by said transmitter.

6. The vehicle safety lighting and signaling system of claim 1, further comprising a battery to provide power to said transmitting unit.

7. The vehicle safety lighting and signaling system of claim 6, further comprising a battery charger to charge said battery.

8. The vehicle safety lighting and signaling system of claim 1, wherein each signal unit further comprises: a central processor unit in communication with the reciever; and an antenna in communication with said receiver, wherein each signal unit receives a control signal and selectively decodes said control signal received from the transmitting unit.

9. The vehicle safety lighting and signaling system of claim 8, wherein said control signal comprises a binary serial number identifying one or more said signal units.

10. The vehicle safety lighting and signaling system of claim 9 wherein each signal unit further comprises a channel code selector associated with the respective signal unit which selects the channel on which the respective signal unit receives control signals, each signal unit being actuated by control signals on the selected channel for that signal unit.

11. The vehicle safety lighting and signaling system of claim 8, wherein each signal unit further comprises a driver circuit in communication with the central processing unit of said signal unit which activates said light source in response to a command from said central processing unit when a control signal associated with the respective signal unit is received by said receiver.

12. The vehicle safety lighting and signaling system of claim 11, further comprising a vibration generator in communication with said driver circuit.

13. The vehicle safety lighting and signaling system of claim 12, wherein said driver circuit activates said vibration generator in response to a command from said central processing unit.

14. The vehicle safety lighting and signaling system of claim 12, wherein at least one signal unit further comprises a timer associated with said central processing unit and having a pre-set time period, said central processing unit activating an alarm signal if the light source is on for a time period exceeding said pre-set time period.

15. The vehicle safety lighting and signaling system of claim 11 wherein each signal unit further comprises an audio source, and wherein said driver circuit activates said audio source on receipt of a predetermined control signal by said receiver.

16. The vehicle safety lighting and signaling system of claim 1, wherein each signal unit further comprises: a base having a fastener device which attaches the signal unit to a rider of said vehicle; and a body secured to said base, the body having a receiver which receives control signals from said transmitter unit, a power source, and a signaling device responsive to predetermined control signals associated with the respective signalunit to produce an output warning signal to drivers in the vicinity of the rider of said vehicle.

17. The vehicle safety lighting and signaling system of claim 16, wherein said base of at least some of said signal units further comprises a band which releasably secures the base about a limb of the rider of the vehicle.

18. The vehicle safety lighting and signaling system of claim 16, wherein said base further comprises a magnetic element and said body further comprises a corresponding magnetic element to retain said body adjacent said base.

19. The vehicle safety lighting and signaling system of claim 16, further comprising a fastener means for releasably fastening said body to said base.

20. The vehicle safety lighting and signaling system of claim 16, further comprising a charging unit having a plurality of charging bays, the body of each signal unit being receivable into any of one or more charging bays for charging said body.

21. The vehicle safety lighting and signaling system of claim 16 wherein said body is formed with a pair of charging contacts for charging said body.

22. The system of claim 1, wherein the right and left signal units comprise at least right and left arm signal units which are attached to the arms of the rider.

23. The system of claim 22, further comprising right and left leg signal units which are attached to the legs of the rider.

24. The system of claim 22, further comprising a back signal unit attached to the back of the rider.

25. The system of claim 23, further comprising a helmet signal unit attached to the back of a helmet worn by the driver, and a back signal unit attached to the back of the rider.

* * * * *